(12) United States Patent
Brueckner et al.

(10) Patent No.: US 7,487,034 B2
(45) Date of Patent: Feb. 3, 2009

(54) DEVICE AND METHOD FOR REDUCING THE CONTAMINATION OF A SENSOR

(75) Inventors: Joerg Brueckner, Sindelfingen (DE); Dirk Foerstner, Stuttgart (DE); Dirk Stockmann, Asperg (DE); Joerg Winbermuehle, Leonberg (DE); Matthias Illian, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 10/583,876

(22) PCT Filed: Feb. 1, 2005

(86) PCT No.: PCT/EP2005/050416

§ 371 (c)(1),
(2), (4) Date: Jun. 21, 2006

(87) PCT Pub. No.: WO2005/093240

PCT Pub. Date: Oct. 6, 2005

(65) Prior Publication Data

US 2008/0133118 A1 Jun. 5, 2008

(30) Foreign Application Priority Data

Mar. 27, 2004 (DE) .................. 10 2004 015 124
Jul. 14, 2004 (DE) .................. 10 2004 033 954

(51) Int. Cl.
*G06F 19/00* (2006.01)
*G06F 11/22* (2006.01)
*G01M 15/00* (2006.01)

(52) U.S. Cl. .................. 701/114; 701/115; 702/183; 73/114.58

(58) Field of Classification Search .................. 123/479, 123/494, 672, 688; 701/29, 31, 101–103, 701/109, 114; 702/182, 183, 184–186; 204/406, 204/425, 426; 73/116, 118.1, 118.2, 114.01, 73/114.58
See application file for complete search history.

(56) References Cited

U.S. PATENT DOCUMENTS

| 4,439,721 | A | * | 3/1984 | Mura .......................... 320/137 |
| 4,562,431 | A | | 12/1985 | Jahnke et al. |
| 4,804,454 | A | * | 2/1989 | Asakura et al. ............. 204/406 |
| 5,044,335 | A | | 9/1991 | Flaig |
| 6,758,788 | B2 | * | 7/2004 | Itou .............................. 477/8 |
| 2004/0074685 | A1 | * | 4/2004 | Tham ........................ 180/168 |
| 2005/0096835 | A1 | | 5/2005 | Piwonka et al. |

FOREIGN PATENT DOCUMENTS

| DE | 32 31 142 | 12/1983 |
| DE | 39 32 304 | 4/1991 |

(Continued)

*Primary Examiner*—Willis R Wolfe, Jr.
(74) *Attorney, Agent, or Firm*—Michael J. Striker

(57) ABSTRACT

With devices and methods for reducing the contamination of a sensor, a sensor or sensor element—preferably a hot film air-mass meter—is deactivated when a software function integrated in the electronic control unit detects a possible contamination or a media carry-in. The sensor is deactivated using a high-side switch in the voltage supply or a low-side switch in the ground connection, wherein the media carry-in detection and the switch control are carried out by the control unit or an evaluation unit in the sensor. After the sensor is deactivated, a substitute signal is optionally generated that replaces the missing output signal of the sensor.

13 Claims, 2 Drawing Sheets

FOREIGN PATENT DOCUMENTS

| | | |
|---|---|---|
| DE | 101 63 751 | 7/2003 |
| GB | 2 121 187 | 12/1983 |
| JP | 58-205819 | 11/1983 |
| JP | 3-120423 | 5/1991 |
| JP | 3-502353 | 5/1991 |
| JP | 2005-513345 | 5/2005 |
| KR | 2003 077 051 | 10/2003 |

\* cited by examiner

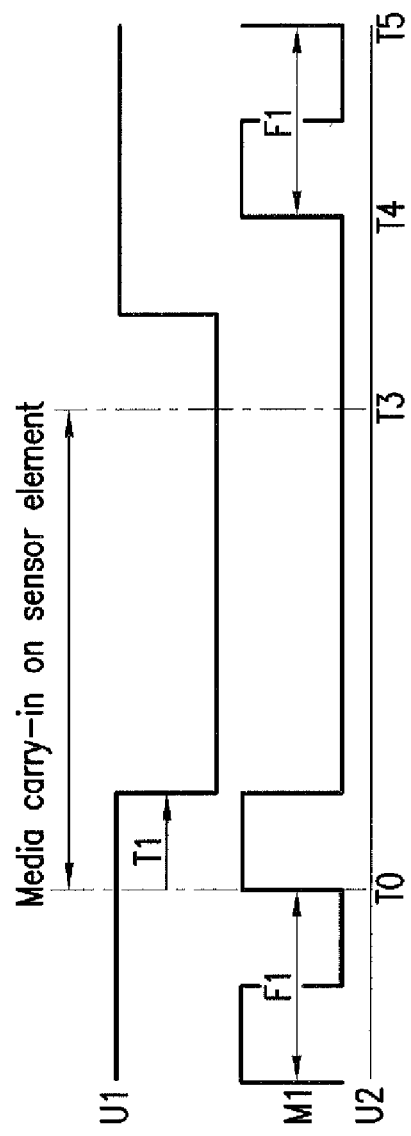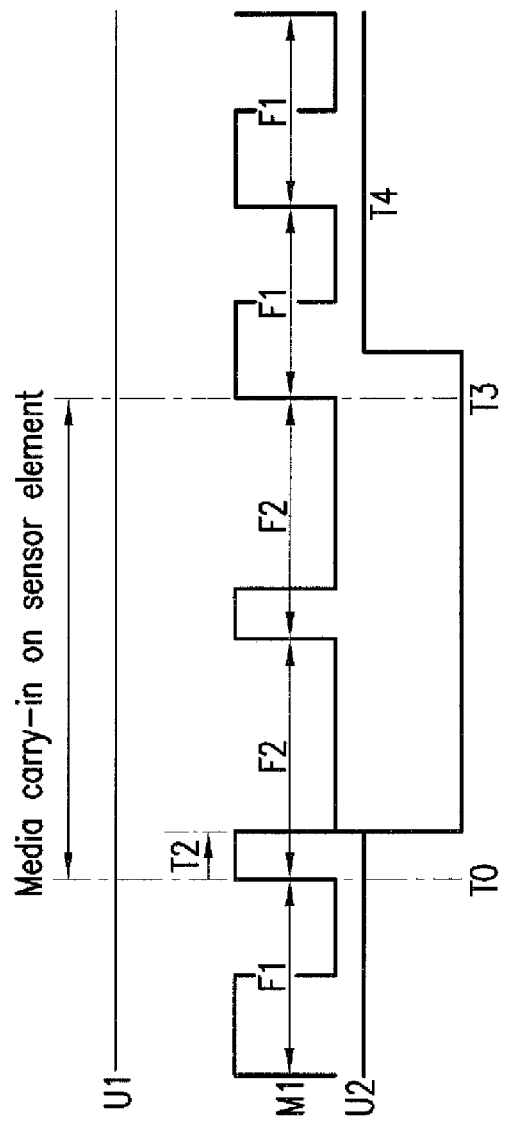

DEVICE AND METHOD FOR REDUCING THE CONTAMINATION OF A SENSOR

The present invention relates to devices and methods for reducing the contamination of a sensor, in particular a hot film air-mass meter in a motor vehicle.

BACKGROUND OF THE INVENTION

The functionality and service life of sensors can be negatively affected by certain operating states and environmental influences. For example, the output signal of a hot film air-mass meter can be corrupted briefly or permanently by an impermissibly high level of contamination caused by the carry-in of harmful media such as oil, water, particles or salt crystals during vehicle operation. With some types of sensors, the operation of the sensors itself even promotes the depositing of harmful media.

Sensors already exist today that are deactivated in some operating states, e.g., during engine after run, that is, for a certain length of time after vehicle operation has ended, during which time some systems are still supplied with voltage. This takes place without any additional switches, e.g., by the driver switching off the voltage via terminal 15 of the vehicle. When the driver switches off the voltage via terminal 15, hot film air-mass meters are also deactivated.

The problem of a measuring error potentially occurring when a hot film air-mass meter becomes contaminated is known and necessitates that countermeasures be taken.

It is therefore provided in DE 101 63 751 A1, for example, that the output signal of a hot film air-mass meter be changed if contamination occurs or that a different signal be accessed, to prevent measuring errors. A short-term depositing of media on a sensor is detected during vehicle operation, e.g., via a software function that evaluates certain sensor signals or default signals. A plausibility check of this type or substitution of the air-mass sensor signal carried out when a signal disruption occurs ensures that the internal combustion engine can continue to be operated reliably even if the sensor is contaminated. The software function used to detect the media carry-in includes, e.g., a calculation of the difference between two signal gradients. In DE 101 63 751 A1, therefore, a default signal is accessed when the media carry-in is detected. The publication does not mention the sensor being deactivated if contamination occurs, however.

From DE 32 31 142 A1 it is known to use a sensor that measures the water level with a water display device for fuel water separators. This sensor is deactivated as soon as the water reaches the sensor tip. Corrosion of the sensor tip is thereby prevented, which extends the service life and improves the usability of the sensor.

SUMMARY OF THE INVENTION

The device according to the present invention and the associated method according to the invention have the advantage that a protective function for a sensor is retained that reliably ensures that the sensor is not contaminated or destroyed under unfavorable conditions. This advantage is attained by the fact that the sensor is deactivated when unfavorable operating conditions are detected.

Particularly advantageously, it is possible to deactivate a sensor—a hot film air-mass meter in particular—intelligently and briefly when there is a risk of contamination during vehicle operation. As a result, the depositing of harmful media, e.g., the contamination of the sensor, is prevented or at least reduced. A short-term depositing of media on the sensor during vehicle operation can be advantageously detected using a software function that evaluates certain sensor signals or default signals. To detect a short-term media carry-in, the difference between two signal gradients is evaluated, for example, and, if certain specifiable deviations are found, a possible media carry-in is detected and the sensor is deactivated, this deactivation advantageously taking place only for a certain period of time, and the sensor being reactivated in particular at the end of a phase with a risk of media carry-in.

It is particularly advantageous that a protective function can be provided with the means of attaining the object of the present invention that is capable of deactivating a sensor—deliberately and for an optimum period of time—using software and/or hardware after media carry-in has been detected, in particular to increase the service life of the sensor and prevent measuring errors. By using an additional high-side or low-side switch, an advantageous hardware function is provided that makes it possible to deactivate the sensor deliberately and briefly when a suitable software function is used.

With a hot film air-mass meter, the advantageous deactivation that is carried out when there is a risk of contamination results in a measurable improvement in the service life and usability, since hot film air-mass meters incur fewer deposits in the switched-off state than they do during operation. The hardware deactivation function can be realized in a very cost-effective manner in particular by using a low-side switch. Since a modern engine control unit often includes a large number of integrated low-side switches anyway that can be located within a component, special low-side switches of this type that are provided for reserve purposes can be activated and are therefore available free of charge. As an alternative, it is also possible to use an additional high-side switch. A suitable software function triggers the switch provided for deactivating the sensor such that it is actively switched off only when a harmful media carry-in during operation is detected by the sensor itself or by other auxiliary variables, and in the after run of the electronic control unit, if necessary.

A further advantageous configuration of the present invention that enables a particularly rapid deactivation of the sensor element is obtained by realizing the deactivation function in the sensor itself. The deactivation control system is located in the sensor, which prevents the electronic control unit and its software from influencing the deactivation. A switching element is therefore advantageously integrated in the sensor or the sensor element, via which the sensor can be deactivated. This embodiment of the present invention has the further advantage that rapid, pulsed, multiple deactivation is possible in order to determine the optimum deactivation period and to provide the electronic control unit with a valid measured value again as soon as the media carry-in ends.

In addition, the use of signals internal to the sensor enables a more exact detection of media carry-in than is possible simply by evaluating the sensor output signal. This is due to the fact that a larger number of signals or features is available inside the sensor, all of which cannot be transmitted by the sensor to the electronic control unit due to the signal transmission width, which has been optimized for reasons of cost. The hardware deactivation function can be realized in a very cost-effective manner in particular by using hardware and software inside the sensor and by evaluating control signals inside the sensor, e.g., voltages or currents of closed control loops that are only available in the sensor.

The description of an intelligent protective function inside the sensor that is composed of suitable software and/or hardware will be advantageously subdivided into numerous subfunctions. Subfunction 1 is capable of detecting a media carry-in, e.g., by calculating the difference between two signal gradients and using additional signals inside the sensor and, as a result, it is capable of deactivating the sensor element contained in a sensor. Subfunction 2 provides a default signal or a default value that can be output by the sensor instead of the invalid measured value when media carry-in is detected.

Subfunction 3 supplements the sensor output signal with the additional information that media carry-in has been detected, this media carry-in information advantageously remaining for the duration of the media carry-in.

The media carry-in information can take the form of a frequency signal, i.e., a signal, the frequency of which is the actual measured quantity, by modulating or adjusting a defined pulse-width ratio, so that the measured value or a default value can be output and transmitted together with the media carry-in information. With an analog signal, a value outside the useful signal range can be transmitted instead of the default value and thereby notify the electronic control unit that media carry-in has occurred.

Via the aforementioned advantageous embodiment of the present invention it is ensured that sensor elements can be deliberately deactivated when short-term media carry-in occurs. It is also ensured that, when media carry-in is detected, sensors are capable of transmitting this information to the receiver, and it is ensured that, when media carry-in occurs, that a sensor does not detect and transmit a measured value that deviates greatly from the real value. The error tolerance can be reduced in this case by providing a default value for the measured signal.

BRIEF DESCRIPTION OF THE DRAWINGS

An exemplary embodiment according to the related art is shown in FIG. 1. FIG. 5 applies to the exemplary embodiments according to FIG. 2 or 3, and FIG. 6 applies for the exemplary embodiment according to FIG. 4. The exemplary embodiments shown in the drawing are explained in greater detail in the description below.

DETAILED DESCRIPTION OF THE PREFERRED EMBODIMENTS

Figure 1:
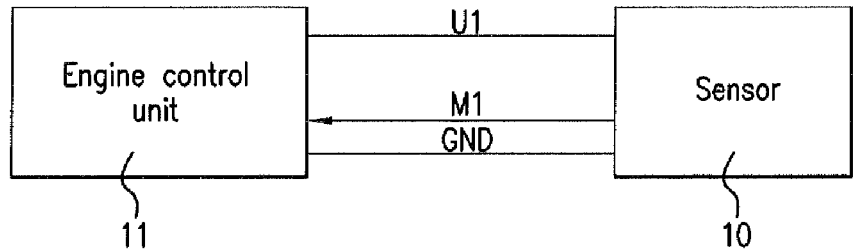

FIG. 1 shows an example of the connection between a sensor 10 and an engine control unit 11 according to the current related art. Sensor 10 is, e.g., a hot film air-mass meter that outputs a measured signal M1 via a line L1 to engine control unit 11. Depending on the design of sensor 10, this measured signal M1 is prepared to a greater or lesser extent, and it can be present as analog voltage or already as a digital signal. A live connection L2 having a voltage U1 that serves as the supply voltage is located between sensor 10 and engine control unit 11. Ground connection GND is a further connection between sensor 10 and engine control unit 11.

Figure 2:
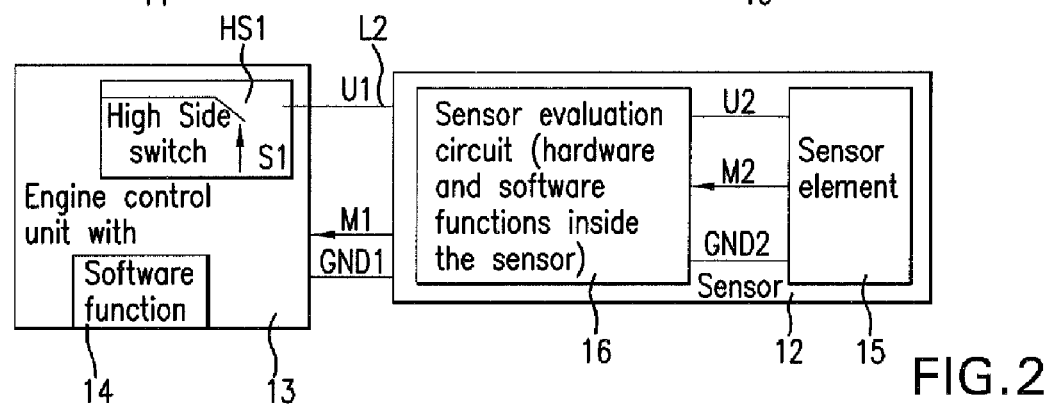
FIG. 2 and FIG. 3 show two alternative exemplary embodiments for the deactivation of a sensor during vehicle operation, the deactivation means being integrated in an electronic control unit. A further exemplary embodiment of the present invention is shown in FIG. 4, with which the sensor element can be deactivated inside the sensor via a switching means inside the sensor. Signal curves for normal operation and during operation when media carry-in occurs are shown in FIGS. 5 and 6.

FIG. 2 shows a first exemplary embodiment of the present invention for a sensor 12, e.g., a hot film air-mass meter, the output signal of which is evaluated by an engine control unit 13, with which an additional switch HS1 is provided as compared with the design shown in FIG. 1. This switch HS1 is a "high-side switch" that accesses live line L2 and interrupts it if necessary. Switch HS1 is part of engine control unit 13. With the embodiment shown in FIG. 2, high-side switch HS1 serves to deactivate sensor 12 during vehicle operation, whereby supply voltage U1 (12 volts or 5 volts) of sensor 12 is switched off. A software function 14 contained in engine control unit 13 detects the media carry-in by intelligently evaluating the detected sensor-measured signal M1 and deactivates sensor 12 for a defined period of time via control signal S1 for high-side switch HS1. This time can be a selected, specifiable period of time. It is also possible to leave the sensor deactivated until the software function in the engine control unit detects that the risk of media carry-in has passed.

Sensor 12 can include, e.g., the components sensor element 15 and a signal evaluation circuit 16 with hardware and software functions inside the sensor, as shown in FIG. 2. Sensor element 15 delivers measured signal M2 to sensor evaluation circuit 16. Voltage supply is labeled U2, and the ground connection is labeled GND2. This configuration of the sensor is only an example and is not absolutely necessary.

The exact mode of operation of the software function will not be described in greater detail here. An essential aspect of the present invention is the fact that the software function runs in a processor of electronic control unit 13, enables detection of the media carry-in, and can generate triggering signals to actuate the switch, these triggering signals each activating an opening or closing of switch HS1 at times determined via the software function.

Various possibilities for detecting a media carry-in via intelligent evaluation of the detected sensor-measured signal are described in publication DE 101 63 75 A1. These possibilities can be incorporated in the software function of engine control unit 13.

Figure 3:
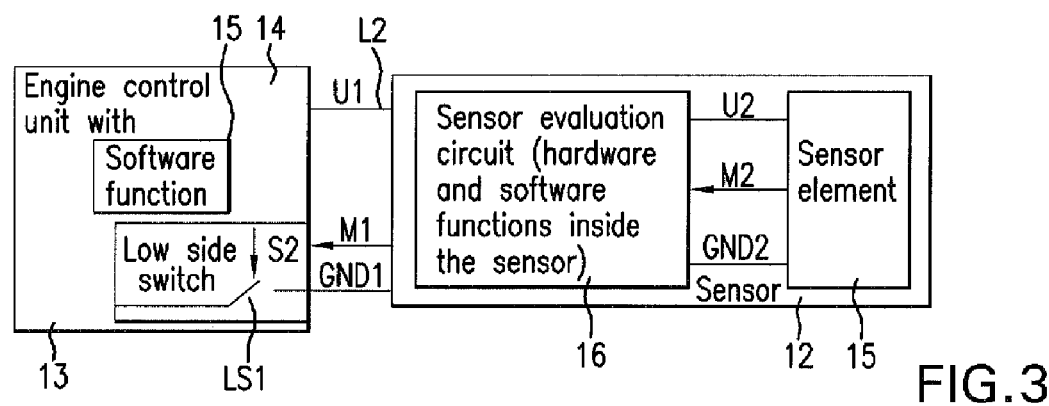

FIG. 3 shows a further embodiment of the deactivation of the sensor during vehicle operation using a cost-effective low-side switch LS1 that is part of engine control unit 13 and that deactivates the ground GND connection of sensor 12. This stops the heating of sensor 12, e.g., a hot film air-mass meter, and the media carry-in is no longer able to contaminate the sensor. In this exemplary embodiment as well, a software function 14 in engine control unit 13—which basically operates like the software function in FIG. 2 —detects the media carry-in by intelligently evaluating detected sensor-measured signal M1 and deactivates sensor 12 for a certain period of time by actuating low-side switch LS1, e.g., using a triggering signal S2. The same interrelationships described in conjunction with FIG. 2 apply with regard for the time.

The use of a low-side switch allows the hardware deactivation function to be realized in a very cost-effective manner, since it does not require any additional outlay with many electronic control devices, since low-side switches of this type are redundant in modern electronic control devices, i.e., they are provided anyway for reserve purposes.

One possible alternative would be to deactivate the sensor starting with a highly simplified software function that deactivates the sensor during vehicle operation at a certain point in time via an additional switch. A deactivation of this type can be, e.g., deactivation during after run of the electronic control unit, whereby the switch can be located at a suitable point in the electronic control unit or outside of it.

In a further alternative with modified wiring, a switch is used that serves to short-circuit supply voltage U1 with ground GND, and the switching function described above is realized. As a result, the power supply to the sensor is short-circuited on the sensor side, and the electromagnetic compatibility EMC may be improved.

With the exemplary embodiments shown in FIGS. 2 and 3, methods for the deliberate deactivation of a sensor when contamination is likely can be carried out, wherein detection of media carry-in is not carried out inside the sensor, and switching procedures for the switches inside the electronic control unit are delivered by the electronic control unit. The use of high-side or low-side switches at sensor supply line U1 or at ground line GND in electronic control unit 13 are required to carry out the method. The use of an intelligent software function in the engine control unit is also necessary, this intelligent software function triggering the switches used only for certain periods of time such that the switch interrupts the power supply to the sensor. The selection of the time frames or the start of deactivation depends on whether media carry-in is possible. If media contamination or media carry-in of this type is possible or expected, the sensor is deactivated.

According to the present invention, a device for reducing the contamination of a sensor is also included, with which the sensor is connected with a control unit, e.g., an engine control unit, this connection including a voltage supply, a ground connection and a signal connection. The sensor includes a sensor element, a sensor evaluation circuit and a switching means that interrupts the voltage supply, the sensor evaluation circuit delivering the triggering signal for the switching means to interrupt the voltage supply. Deactivation of the sensor element—carried out within the sensor itself—when contamination is likely is therefore made possible.

Figure 4:
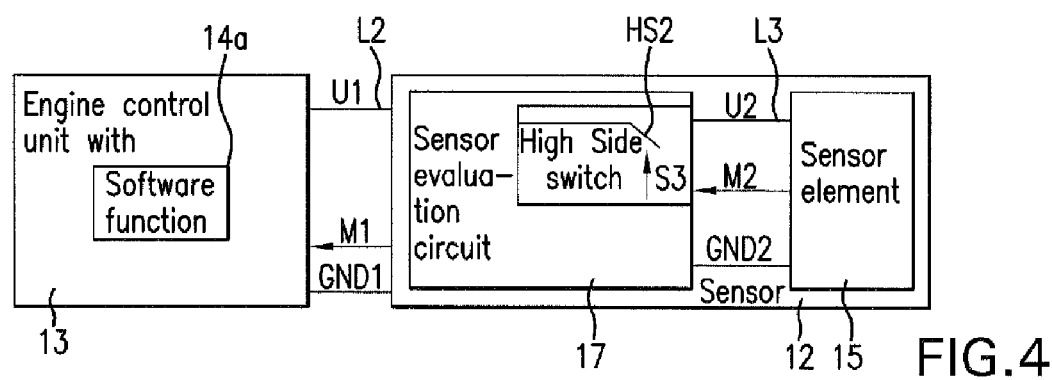

An exemplary embodiment of this type is depicted in FIG. 4 that makes it possible to deactivate sensor 12 or sensor element 15 inside the sensor using a high-side switch HS2. A low-side switch that can interrupt ground connection GND2 could be used as an alternative. Other switches can also be used with this deactivation function, which has been moved to sensor 12 and sensor evaluation circuit 17; the other switches are installed in sensor 12, in sensor evaluation circuit 17 and in sensor element 15 and deactivate the sensor or the sensor element as required, e.g., by delivering a deactivation signal S3. The switch can have various configurations, depending on the type of sensor element used.

The design of the sensor and the connections between sensor element 15 and the sensor evaluation circuit are configured as shown in FIG. 2. In contrast to the exemplary embodiment depicted in FIG. 2, however, line L3 between sensor element 15 and sensor evaluation circuit 17 that supplies voltage U2 can be interrupted using high-side switch HS2.

Sensor evaluation circuit 17, which includes the hardware and/or software functions inside the sensor, detects the media carry-in via evaluation of sensor-element measured signal M2 and, optionally, via evaluation of the additional signals that are available in the sensor evaluation circuit. If media carry-in is detected, deactivation is carried out. Electronic control unit 13 may only also require a simplified software function 14a.

The depiction of an intelligent protective function inside the sensor, which can be composed of a suitable hardware and/or software function, can be subdivided into individual subfunctions, wherein three subfunctions are advantageous, for example.

Subfunction 1 is capable of deliberately deactivating sensor element 15 contained in a sensor 12 for an optimum period of time after media carry-in has been detected, sensor element 15 detecting the measured signal and coming in direct contact with the medium. The measured signal and further signals inside the sensor are evaluated for this purpose inside the sensor, e.g., in a sensor evaluation circuit 17, using filter functions and plausibility criteria with threshold values. When media carry-in is detected, a deactivation signal S3 is generated that deactivates sensor element 15 by actuating a switch, e.g., high-side switch HS2, and interrupts the voltage supply to the sensor element. With a hot film air-mass meter it is therefore possible to deactivate the actual sensor element if media carry-in, e.g., water in the sensor, is detected. This enables contamination of the hot film air-mass meter to be prevented or greatly reduced. This applies in particular for hot film air-mass meters that take on fewer deposits in the deactivated state than in the activated state, in which the hot film is at a high operating temperature.

When media carry-in is detected, subfunction 2 provides a default value that is output by sensor 12 instead of the measured value, which would be invalid in this case. If media carry-in occurs, the measured value can be greatly corrupted by the media carry-in and thereby result in measuring errors. By providing a default value, the sensor's measurement error can be reduced when media carry-in occurs. The default value can be, e.g., the most recent valid value measured without media carry-in.

Subfunction 3 supplements the sensor output signal by outputting the information "media carry-in detected" in addition to the measured signal detected by the sensor element. This information, which is also referred to as "media carry-in information" is output for the duration of the media carry-in. This can take place with a frequency signal, i.e., a signal with which the measured quantity is output as the frequency of a square-wave signal, as is common with hot film air-mass meters, e.g., by modulating or adjusting a defined pulse-width ratio of the square-wave signal, so that the measured value or default value can be output and transmitted together with the media carry-in information.

With an analog signal, a value outside the useful signal range can be transmitted instead of the default value. The advantage of this is that an engine control unit can then change over to another default value calculated in the engine control unit by very simply evaluating the sensor signal, provided the default value of the sensor is not usable or available. As a result of all three subfunctions, the scope of the software in the engine control unit is greatly reduced, since the functions of the control unit that would be required otherwise are moved to the sensor. The subfunctions can be parameterized and deactivated, e.g., by programming the sensor.

The shape of the signal curves over time for U1, M1 and U2 during normal operation and in cases of media carry-in are shown in FIG. 5 for the exemplary embodiments according to FIG. 2 or 3 when a frequency output is used. The media carry-in starts at instant T0 and ends at instant T3. Via voltage signal U1, engine control unit 13 deactivates sensor 12 when media carry-in occurs. In the meantime, reaction time T1 between the instant that media carry-in occurs and when it is detected by the engine control unit software elapses. Sensor output signal M1 is not available. Frequency F1, which represents the measured quantity, is not available during media carry-in, since the sensor is deactivated and cannot deliver a measured signal M1. Starting at instant T4, the sensor emits a signal again, the frequency F1 of which is available again at instant T5 and can be used by the control unit to determine controlled variables related to the engine.

FIG. 6 shows the shapes of the signal curves over time for U1, M1 and U2 during normal operation and when media carry-in occurs when the subfunctions inside the sensor as depicted in FIG. 4 are used, i.e., given the possibility of deactivating sensor 12 using a switch inside the sensor. The media carry-in starts at time T0 and ends at instant T3. Sensor 12 remains activated via voltage U1 during the media carry-in, but sensor element 15 is deactivated internally via high-side switch HS2, since the supply of voltage U2 to sensor element 15 is interrupted. High-side switch HS2 is triggered with the aid of a triggering signal S3 that is generated in sensor evaluation circuit 17.

In this case, reaction time T2 until the media carry-in is detected is markedly shorter than reaction time T1 depicted in FIG. 5 attained with the embodiments depicted in FIG. 2 or 3. Since sensor evaluation circuit 17 remains activated and is still supplied with voltage U1, the sensor evaluation circuit can generate a default value for the measured signal when media carry-in is detected and sensor element 15 is deactivated. The default value then has, e.g., frequency F2, which deviates slightly from frequency F1 (without media carry-in) and can be evaluated by the engine control unit. The error tolerance will be less than the transmission of the value that was corrupted by the media carry-in. The media carry-in information is transmitted by the pulse-width ratio of M1, which is modified as compared to frequency F1. The concept of frequency refers in general to the on/off ratio or pulse-width ratio, so that F1 corresponds to a first on/off ratio TV1 or a first pulse-width ratio, and F2 corresponds to a second on/off ratio TV2 or a second pulse-width ratio, and it is important that F1 and F2 differ from each other in a specifiable manner.

If the media carry-in lasts for a while, sensor element 15 can be turned on and off multiple times. This makes it possible for sensor 12 to periodically detect the media carry-in, until the media carry-in is no longer present. The sensor element is therefore deactivated only for the actual duration of the media carry-in.

When the present invention is used in the automotive field, in particular with an air-mass meter, the output signals of which are evaluated by a control unit, a possible alternative is obtained. One possible alternative to the engine control unit is, e.g., the use of any communication partner for the sensor or to evaluate the signals delivered by the sensor.

The present invention is not limited to the combination of sensor, engine control unit, and motor vehicle. Instead, it can be used in any manner for sensors that include an assigned control unit or processor with a software function for detection of a possible media carry-in, and that include triggerable switches. In general, the present invention can be provided for all applications as an alternative to its use in the automotive field, i.e., in fields in which electronic, electrically operated biochemical, biotechnological or other types of sensors or sensor elements are used and that communicate in any manner with a communication partner and report a media carry-in, whereby the sensors or sensor elements are actively protected against contamination by deliberating deactivating sensor elements or parts thereof.

What is claimed is:

1. A device for reducing the contamination of a sensor that is connected with a control unit, this connection including a voltage supply, a ground connection and a signal connection,
    wherein switching means are provided that interrupt either the voltage supply or the ground connection, wherein the control unit includes a software function that delivers the triggering signal for the switching means,
    wherein the sensor is a sensor in a motor vehicle in the form of a hot film air-mass meter, and the signal is a signal that represents an air mass, and
    wherein the electronic control unit or the sensor evaluation circuit includes means for detecting contamination, and means for generating a triggering signal for the switching means to interrupt the voltage supply in the form of a processor with memory means and an associated software function.

2. A device for reducing the contamination of a sensor that is connected with a control unit, this connection including a voltage supply, a ground connection and a signal connection,
    wherein switching means are provided that interrupt either the voltage supply or the ground connection, and wherein the control unit includes a software function that delivers the triggering signal for the switching means,
    wherein the switching means for interrupting the voltage supply or the ground connection are located in the control unit and an evaluation unit of the sensor.

3. The device as recited in claim 2, wherein the switch is a high-side switch that interrupts the voltage supply, or a low-side switch that interrupts the ground connection.

4. The device as recited in claim 2, wherein the control unit is an engine control unit.

5. The device as recited in claim 2, wherein the sensor includes at least one sensor element and an evaluation device that is connected with the sensor element, in particular an evaluation circuit, the connection including at least one voltage supply, a ground connection and a signal connection.

6. The device as recited in claim 2, wherein the electronic control unit or the sensor evaluation circuit includes means for detecting contamination, and means for generating a triggering signal for the switching means to interrupt the voltage supply, in particular a processor with memory means and an associated software function.

7. The device as recited in claim 2, wherein electronic, electrically operated biochemical, biotechnological or other types of sensors or sensor elements are used that communicate with a communication partner and report contamination and actively safeguard the sensors or sensor elements against contamination via the deliberate deactivation of sensor elements or parts thereof.

8. A method for reducing the contamination of a sensor that is connected with a control unit, with a device for reducing the contamination of a sensor that is connected with a control unit this connection including a voltage supply, a ground connection and a signal connection, wherein switching means are provided that interrupt either the voltage supply or the ground connection, and wherein the control unit includes a software function that delivers the triggering signal for the switching means,
    wherein the software function evaluates the measurement signal delivered by the sensor and generates control signals S1, S2, S3 for the switching means based on specifiable parameters of the measured signal or on variables derived from the measured signal, and
    wherein the software function detects a contamination of the sensor or contamination in the region of the sensor and generates the control signals as a function of this detection.

9. The method as recited in claim 8, wherein the switch that has interrupted the power supply to the sensor is reset after a specifiable period of time, and the connection between the control unit and the sensor is restored.

10. The method as recited in claim 8, wherein a hardware deactivation function is combined with a software function, the combination taking place such that the software function actively deactivates the switch—which is the hardware—such that, if a harmful media carry-in takes place during operation, this is detected by the sensor itself or by the control unit, and the sensor is deactivated.

11. The method as recited in claim 8, wherein the sensor is deactivated during the after run of the electronic control unit via the opening of either the high-side switch or the low-side switch.

12. The method as recited in claim 8, wherein the measured value is output as frequency (F1) with an on/off ratio TV1 and, if there is contamination, a default value (F2) is output with an on/off ratio TV2 that differs from on/off ratio TV1 of the frequency of the measured value in a specifiable manner.

13. The method as recited in claim 8, wherein the measured value is output as frequency (F1) with a first pulse-width ratio and, if there is contamination, a default value is output with a second pulse-width ratio that differs from the first pulse-width ratio of the measured value in a specifiable manner.

* * * * *